No. 610,502. Patented Sept. 6, 1898.
A. T. STURGESS.
MELTING APPARATUS FOR SOLDER.
(Application filed Jan. 4, 1898.)

(No Model.)

Witnesses.
Robert Everett
F. B. Keefer

Inventor.
Archibald T. Sturgess.
By
James L. Norris
Atty.

THE NORRIS PETERS CO., PHOTO-LITHO., WASHINGTON, D. C.

UNITED STATES PATENT OFFICE.

ARCHIBALD THOMAS STURGESS, OF MADRID, SPAIN.

MELTING APPARATUS FOR SOLDER.

SPECIFICATION forming part of Letters Patent No. 610,502, dated September 6, 1898.

Application filed January 4, 1898. Serial No. 665,593. (No model.)

*To all whom it may concern:*

Be it known that I, ARCHIBALD THOMAS STURGESS, engineer, a subject of the Queen of Great Britain, residing at Alcala, 52, Madrid, in the Kingdom of Spain, have invented certain new and useful Improvements in Melting Apparatus for Solder Metal in the Making of Pipe-Joints, of which the following is a specification.

This invention relates to improvements in apparatus for use in the melting of solder, lead, or other metal and the making of joints in piping and like uses.

The object of the invention is to provide a portable apparatus for use in melting lead or other metal for soldering pipe-joints in the construction of sewers and water-mains and to provide means for supporting such apparatus upon a line of pipes in such manner as to permit of its ready passage along the length of such pipes.

Figure 1:
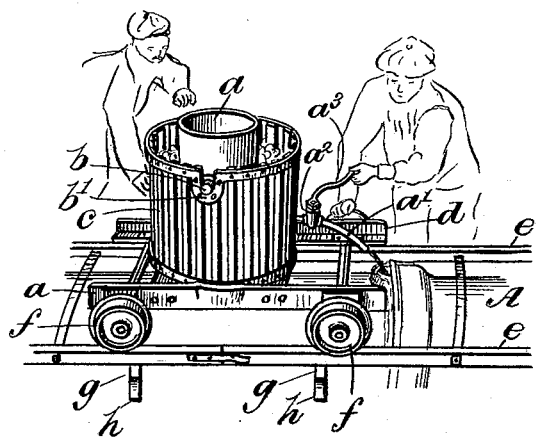
Figure 2:
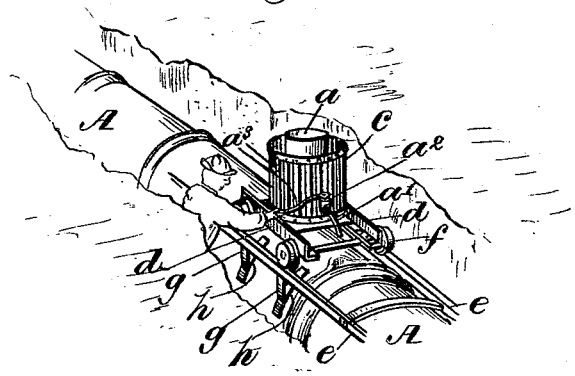

Figure 1 shows a perspective side view of the apparatus in use. Fig. 2 shows a perspective front view of the same in use on a smaller scale than Fig. 1.

In carrying out the invention a metal cage $c$ is employed to hold the fuel employed to melt the metal in a melting-pot or crucible $a$, which pot is preferably provided with arms or trunnions $b$, which trunnions rest in sockets $b'$, formed for them in the upper part of the cage $c$. Near the bottom of the cage is a pipe or conduit $a'$, which is connected with the lower part of the pot $a$, so as to allow the molten metal to flow out thereby from said pot, and the flow through the pipe is controlled by a tap $a^2$, capable of being operated by a suitable key $a^3$. Preferably this pipe $a'$ is screw-jointed at or about the tap for convenience of disconnection and removal of the "lead-pot" and the part of its pipe which projects through the cage side, which removal of pot $a$ is permitted by the manner of supporting the same on the trunnions $b$ in sockets $b'$. The cage is carried on a skeleton carriage $d$, which may conveniently be made of L-section metal, the pot resting on the horizontal legs or flanges.

The letter $e$ indicates the rails of my improved portable track, on which ride the wheels $f$ of the carriage $d$. The rails $e$ are supported on brackets $g$, the bases or bearing-surfaces of which are curved, as indicated at $h$, to rest on and clamp, as it were, the surface of the pipes. Suitable cross-ties extend between the rails and are secured thereto to maintain them in fixed relation to each other, as will be clearly understood. The joints having been properly prepared, the lead-pot on its truck is run over the pipe-track until the spout of the pipe is truly over the pouring-point, and the tap is turned until a sufficiency of metal has been poured, when the tap is turned off and the truck moved to the next point. By these means a line of joints can be made with great facility, rapidity, and convenience, while from the fact that the molten metal during the time that the various pourings are being made has its covering of dirt, scum, and other matter undisturbed, thereby preventing or minimizing evaporization, and the lead being used in the making of the joints being taken from the lower portion of the pot a good joint is more likely to be insured than by the saucepan and dipping methods now in use.

Having now particularly described and ascertained the nature of my said invention and in what manner the same is to be performed, I declare that what I claim is—

In a melting apparatus for soldering the joints of a line of pipes, the combination with a wheeled carriage supporting the fire-cage and crucible of a portable track for said carriage comprising the rails $e$ suitably connected and braced and the brackets $g$ supporting said rails and having the curved bases $h$ adapted to rest on and conform to the curvature of the pipes, substantially as described.

In testimony whereof I have hereunto set my hand in the presence of two subscribing witnesses.

ARCHIBALD THOMAS STURGESS.

Witnesses:
 WILLIAM FOLEY,
 WILLIAM A. GOODE.